(12) United States Patent
Scott

(10) Patent No.: US 7,356,963 B2
(45) Date of Patent: Apr. 15, 2008

(54) FISH LURE

(76) Inventor: Jason E. Scott, P.O. Box 6727, Nogales, AZ (US) 85628-6727

( * ) Notice: Subject to any disclaimer, the term of this patent is extended or adjusted under 35 U.S.C. 154(b) by 0 days.

(21) Appl. No.: 11/471,003

(22) Filed: Jun. 20, 2006

(65) Prior Publication Data

US 2007/0289196 A1   Dec. 20, 2007

(51) Int. Cl.
*A01K 85/02*     (2006.01)
*A01K 85/18*     (2006.01)

(52) U.S. Cl. ............... 43/42.15; 43/42.04; 43/44.82

(58) Field of Classification Search ........... 43/42.15, 43/42.39, 43.16, 44.82, 42.04
See application file for complete search history.

(56) References Cited

U.S. PATENT DOCUMENTS

| | | | | |
|---|---|---|---|---|
| 289,508 | A * | 12/1883 | Dawson | 43/44.82 |
| 788,201 | A * | 4/1905 | Friend | 43/44.82 |
| 879,869 | A * | 2/1908 | Hansen | 43/42.16 |
| 923,095 | A * | 5/1909 | Wilcox | 43/42.15 |
| 974,050 | A * | 10/1910 | Garrison | 43/42.15 |
| 1,109,439 | A * | 9/1914 | Maus | 43/42.15 |
| 1,402,798 | A * | 1/1922 | Ryan | 43/42.15 |
| 1,477,756 | A * | 12/1923 | Heddon et al. | 43/42.15 |
| 1,557,644 | A * | 10/1925 | Andersen | 43/42.15 |
| 1,581,833 | A * | 4/1926 | Bonnett | 43/42.15 |
| 1,602,329 | A * | 10/1926 | Bonnett | 43/42.15 |
| 1,607,107 | A * | 11/1926 | Weller | 43/42.15 |
| 1,692,935 | A * | 11/1928 | Heddon | 43/42.15 |
| 1,707,407 | A * | 4/1929 | Miles | 43/42.16 |
| 1,786,568 | A * | 12/1930 | Kutz | 43/42.15 |
| 1,828,574 | A * | 10/1931 | Neukam | 43/42.15 |
| 2,069,972 | A * | 2/1937 | Schroeder | 43/42.15 |
| 2,233,684 | A * | 3/1941 | Strite | 43/42.15 |
| 2,334,613 | A * | 11/1943 | Dunkelberger et al. | 43/44.82 |
| 2,441,302 | A * | 5/1948 | Watkin | 43/42.15 |
| 2,503,529 | A * | 4/1950 | Wardrip | 43/42.15 |
| 2,606,388 | A * | 8/1952 | Croft, Jr. et al. | 43/42.15 |
| 2,618,092 | A * | 11/1952 | Hinkle | 43/42.15 |
| 2,674,060 | A * | 4/1954 | Simmons | 43/42.15 |
| 2,685,145 | A * | 8/1954 | Dean | 43/42.15 |
| 2,783,580 | A * | 3/1957 | Balboni | 43/44.82 |

(Continued)

FOREIGN PATENT DOCUMENTS

GB     2239151 A * 6/1991

(Continued)

*Primary Examiner*—Darren W. Ark
(74) *Attorney, Agent, or Firm*—Timothy M. Barlow

(57) ABSTRACT

A fish lure includes a soft, fish-shaped body including forward and aft body segments connected by an integrally-formed vertical hinge. A buoyancy-controlling insert is concealed inside the forward body segment. The vertical hinge includes a pair of vertical grooves that extend from the dorsal surface to the ventral surface of the body, defining a hinge web that attaches the forward body segment to the aft body segment. A pair of front hinge surfaces extend between a side of the forward body segment and the hinge, and a pair of rear hinge surfaces extend between a side of the aft body segment and the hinge. The front hinge surface and the rear hinge surface form a hinge angle between 5 and 20 degrees when at rest. Each front and aft hinge surface is angled aft. Water flow past the hinge angle creates flexing of the body at the hinge.

11 Claims, 7 Drawing Sheets

U.S. PATENT DOCUMENTS

| | | | | |
|---|---|---|---|---|
| 2,789,385 | A * | 4/1957 | Seeger | 43/42.15 |
| 2,847,791 | A * | 8/1958 | Simmons | 43/42.39 |
| 2,851,814 | A * | 9/1958 | Lutz | 43/42.15 |
| 2,871,608 | A * | 2/1959 | Fisher | 43/35 |
| 2,965,996 | A * | 12/1960 | Hughes | 43/42.39 |
| 3,165,857 | A * | 1/1965 | Koziba | 43/42.15 |
| 3,218,750 | A * | 11/1965 | Lewin | 43/42.39 |
| 3,490,165 | A * | 1/1970 | Thomassin | 43/42.39 |
| 3,494,062 | A * | 2/1970 | Gardner | 43/42.04 |
| 3,735,518 | A * | 5/1973 | Kleine et al. | 43/42.15 |
| 3,861,073 | A * | 1/1975 | Thomassin | 43/42.39 |
| 4,073,084 | A * | 2/1978 | Favron | 43/42.39 |
| 4,098,017 | A * | 7/1978 | Hall | 43/42.39 |
| 4,317,305 | A * | 3/1982 | Firmin | 43/42.24 |
| 4,878,310 | A * | 11/1989 | Hannon et al. | 43/42.04 |
| 5,265,370 | A * | 11/1993 | Wold | 43/44.82 |
| 5,522,170 | A * | 6/1996 | Cole | 43/42.15 |
| 5,561,938 | A * | 10/1996 | Kato et al. | 43/42.39 |
| 5,579,600 | A * | 12/1996 | Burns | 43/43.16 |
| 5,678,350 | A * | 10/1997 | Moore | 43/42.39 |
| 5,815,978 | A * | 10/1998 | Huddleston | 43/42.39 |
| 5,941,014 | A * | 8/1999 | Battaglia | 43/44.82 |
| D414,543 | S * | 9/1999 | Firmin | D22/133 |
| 5,946,848 | A * | 9/1999 | Ysteboe et al. | 43/42.15 |
| 6,192,618 | B1 * | 2/2001 | Wackerman | 43/42.15 |
| 6,385,896 | B1 * | 5/2002 | Thomassin | 43/42.03 |
| 6,460,286 | B1 * | 10/2002 | Wilson | 43/42.15 |
| 6,560,914 | B2 * | 5/2003 | Kruger | 43/42.03 |
| 6,560,915 | B2 * | 5/2003 | Downey | 43/42.39 |
| 6,912,808 | B1 * | 7/2005 | Mak | 43/42.15 |
| 2002/0189150 | A1 * | 12/2002 | Thorne | 43/42.15 |
| 2006/0117642 | A1 * | 6/2006 | Huddleston | 43/42.39 |
| 2006/0260176 | A1 * | 11/2006 | Yeung | 43/42.15 |

FOREIGN PATENT DOCUMENTS

| | | | |
|---|---|---|---|
| JP | 10-248443 | A * | 9/1998 |
| JP | 2001-321023 | A * | 11/2001 |
| JP | 2002-84927 | A * | 3/2002 |
| JP | 2002-186384 | A * | 7/2002 |
| JP | 2003-79278 | A * | 3/2003 |
| JP | 2004-73158 | A * | 3/2004 |
| JP | 2004-337063 | A * | 12/2004 |
| JP | 2005-185254 | A * | 7/2005 |
| JP | 2005-229910 | A * | 9/2005 |

* cited by examiner

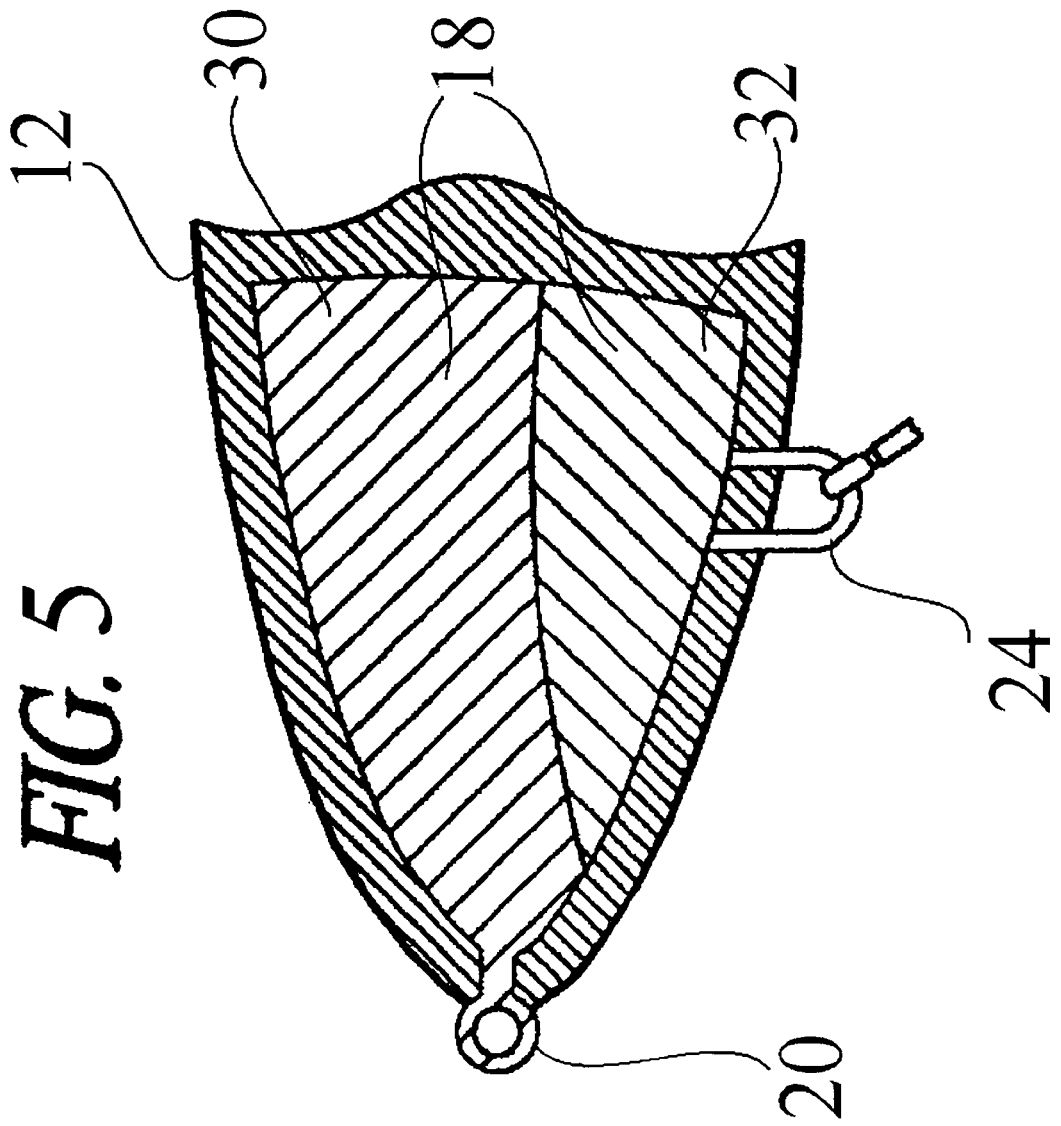

FISH LURE

FIELD OF THE INVENTION

The present invention relates generally to the field of fish lures and more particularly to a jointed, swimming fish lure.

BACKGROUND OF THE INVENTION

Since the advent of modern angling, man has understood that the best baits and lures for fishing have very natural qualities. Some of these qualities are relatively easy to duplicate. Color and shape are particularly straightforward for a bait manufacturer to duplicate from the natural world. Scent and taste have long been understood to be important for many species of game fish. However, lifelike motion has been an elusive objective. Numerous efforts have been made to create lures that move naturally. The results have been mixed. In some cases, bills or lips are attached to lure bodies to force the lure body to shake and vibrate. This motion is said to imitate a wounded fish, which is said to trigger a strike response from a game fish. Later, wire joints were added to those rigid lures to provide a bit of flexibility. Little to no success has been achieved to create a bait or lure that "swims" like a "normal" healthy fish.

Thus, what is desired is a fishing lure that is constructed to provide a smooth, natural swimming motion as it moves through the water.

SUMMARY OF INVENTION

A fish lure includes a soft, fish-shaped body including forward and aft body segments connected by an integrally-formed vertical hinge. A buoyancy-controlling insert is concealed inside the forward body segment. The vertical hinge includes a pair of vertical grooves that extend from the dorsal surface to the ventral surface of the body, defining a hinge web that attaches the forward body segment to the aft body segment. A pair of front hinge surfaces extend between each side (right and left) of the forward body segment and the hinge, and a pair of rear hinge surfaces extend between a side of the aft body segment and the hinge. The front hinge surface and the rear hinge surface form a hinge angle between 5 and 20 degrees when at rest. Each front and aft hinge surface is angled aft. The water flow past the hinge angle creates flexing of the body at the hinge so that the lure appears to swim.

BRIEF DESCRIPTION OF THE DRAWINGS

FIG. 5 is a detail view of a buoyancy-controlling insert for the fish lure, according to the present invention;

DETAILED DESCRIPTION OF THE DRAWINGS

Figure 1:
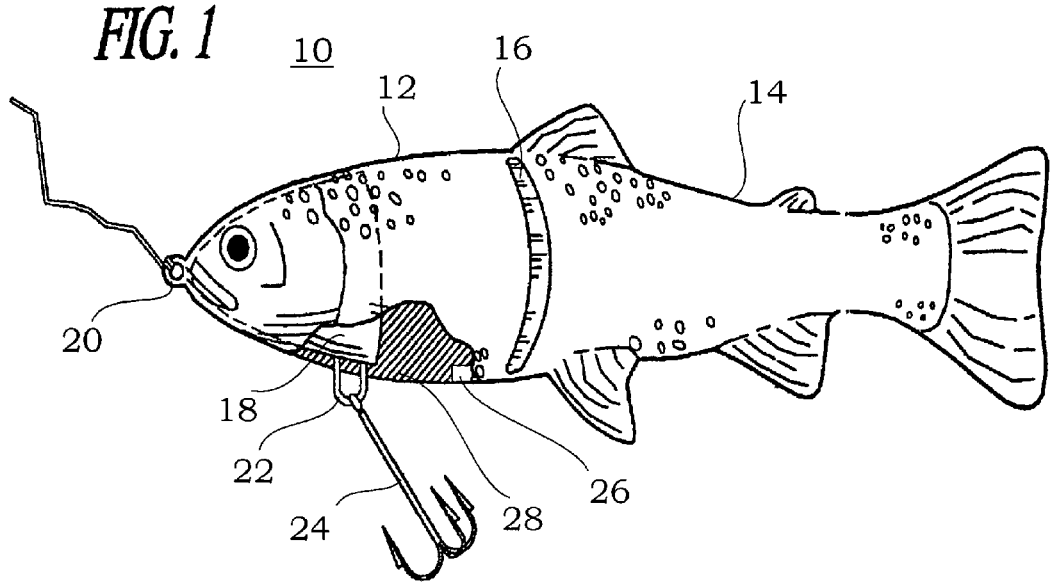
FIG. 1 is a side view of a fish lure, in accordance with the present invention.
Figure 2:
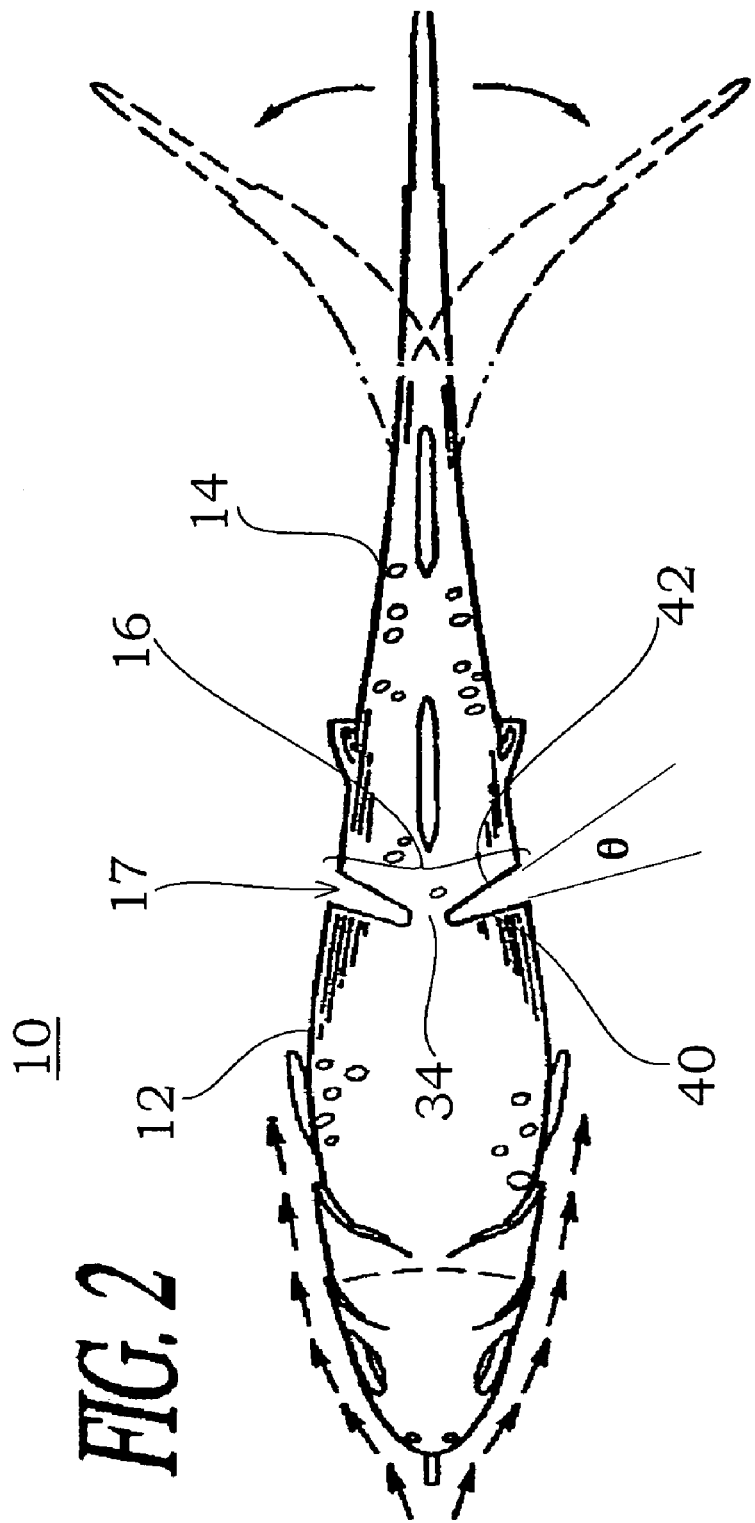
FIG. 2 is a top view of a single-jointed fish lure, in accordance with the present invention.
Figure 3:
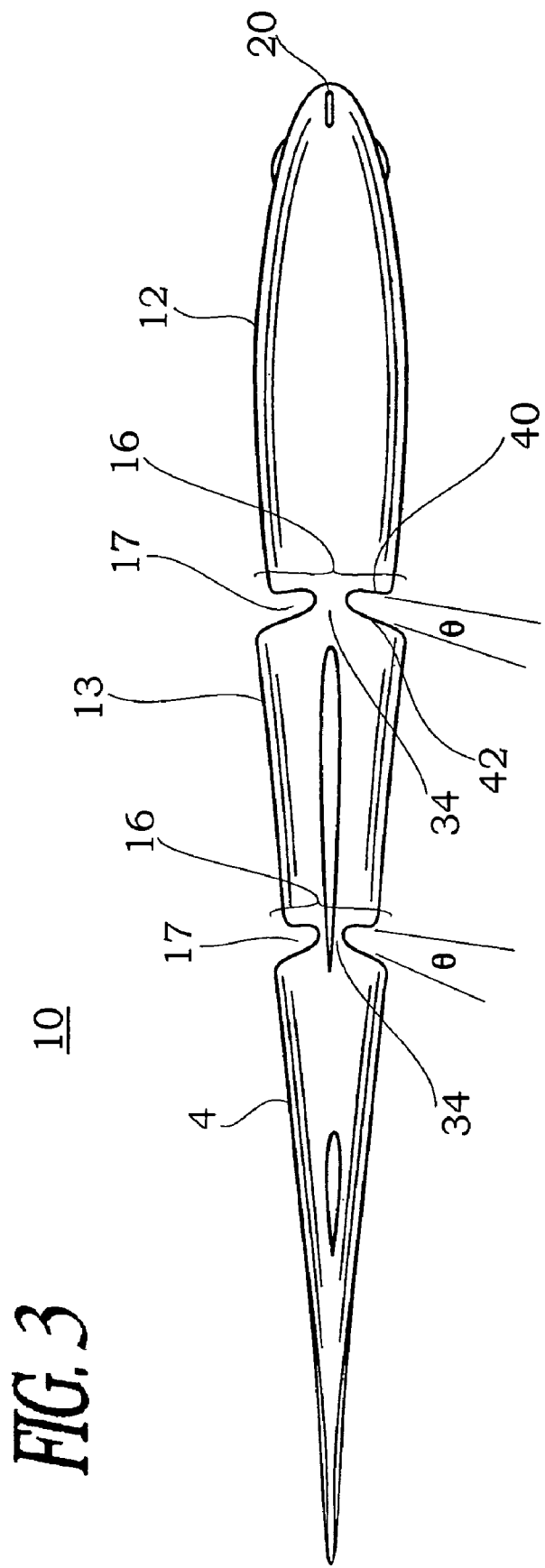
FIG. 3 is a top view of a double-jointed fish lure, in accordance with the present invention.

FIGS. 1-3 illustrate a flexible, hinged fish lure having a soft, fish-shaped body 10 The body 10 includes a forward body segment 12 and an aft body segment 14 connected by an integrally-formed vertical hinge 16. FIG. 3 shows an embodiment that includes more than one hinge 16. A center body segment 13 is shown between the forward body segment 12 and the aft body segment 14. The plurality of hinges 16 further enhances the movement of the lure through the water. The body 10 may also include a buoyancy-controlling insert 18 inside the forward body segment 12.

The vertical hinge 16 is defined by a pair of vertical grooves 17, one on each side of the body 10. The grooves 16 extend from the dorsal surface to the ventral surface of the body 10 and define a hinge web 34 that attaches the body segments 12, 13, 14 to each other.

FIG. 2 shows that the grooves 16 may be further defined by a pair of front hinge surfaces 40, each front hinge surface 42 extending between a respective side of the forward body segment 12 and the web 34, and a pair of rear hinge surfaces 42, each rear hinge surface 42 extending between a respective side of the aft body segment 14 and the web 34. Each of the front hinge surfaces 40 and rear hinge surfaces 42 extends from the web at a first location and terminates at a second location at its respective side surfaces with the first location being forward of the second location. In one embodiment, the grooves 16 are symmetric when viewed from above or below.

FIGS. 2 and 3 illustrate top views of the lure and provide details of the hinge 16 construction. In one embodiment, the front hinge surface 40 and the rear hinge surface 42 define a hinge angle θ when the hinges 16 are not flexed. In one embodiment, the hinge angle θ is about 10 degrees. In another embodiment, the hinge angle θ is between 5 and 25 degrees.

As shown in FIGS. 2 and 3, each front hinge surface 40 is angled generally aft. In addition, each aft hinge surface 42 is angled generally aft. In one embodiment, the front hinge surface 40 is angled aft about 15 degrees. In another embodiment, the front hinge surface 40 is angled aft between zero and 20 degrees. In one embodiment, the aft hinge surface 42 is angled aft about 25 degrees. In another embodiment, the aft hinge surface 42 is angled aft between 10 and 30 degrees.

FIG. 3 shows that in an alternate embodiment, the rear hinge surfaces 42 extend laterally beyond the matching front hinge surfaces 40. That is, the rear hinge surfaces are broader than the matching front hinge surfaces 40. Thus, the forward end of the aft body segment 14 will be slightly wider than the aft end of the center body segment 13. Also, the forward end of the center body segment 13 will be slightly wider than the aft end of the forward body segment 12.

Figure 4:
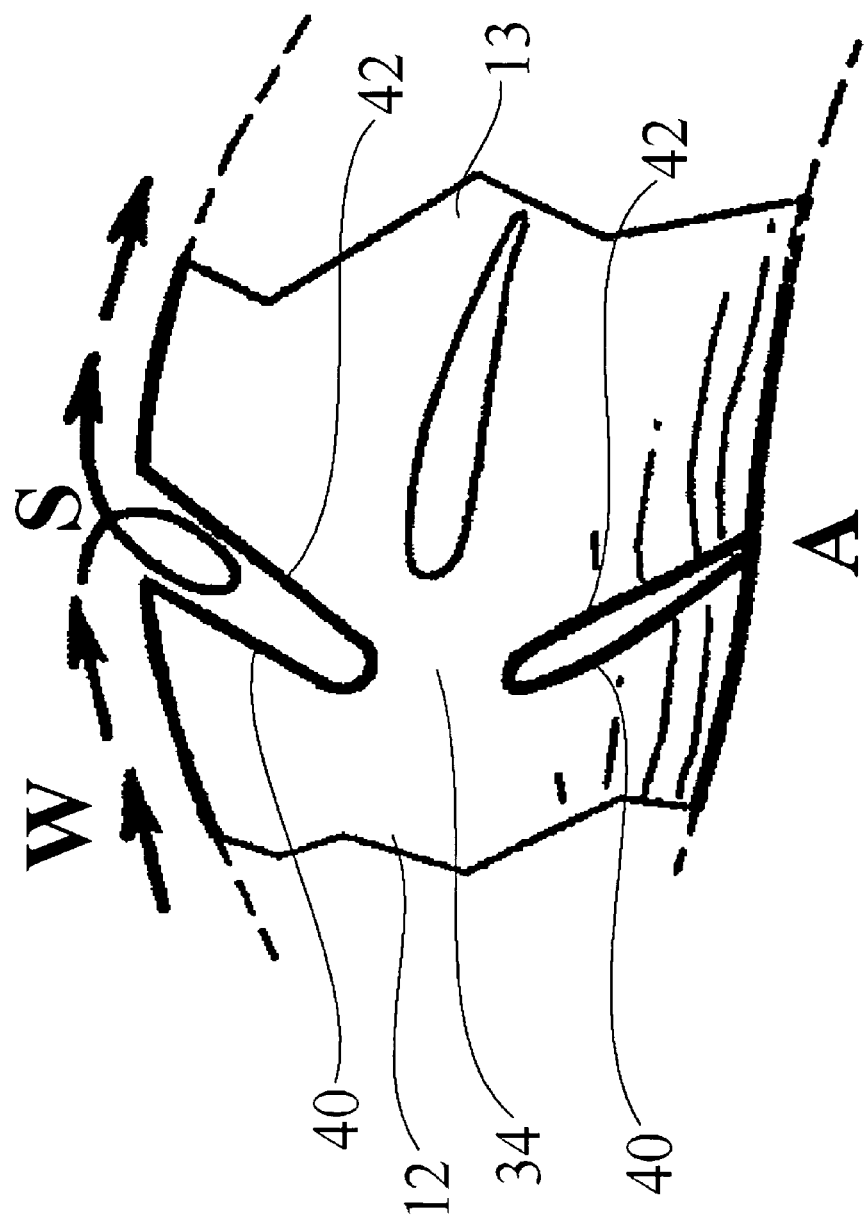
FIG. 4 is a detail view of the hinge for the fish lure, in accordance with the present invention.

FIG. 4 shows how this lure works as it is drawn through the water. As stated above, the lure includes two or more body segments 12, 13, 14 connected by one or more vertical hinges 16. The hinges 16 permit horizontal, lateral movement of the body segments 12, 13, 14 relative to each other. The body segments 12, 13, 14 and hinges 16 can be formed as a single piece of a flexible homogenous material 28, such as a type of rubber.

As the water flow W passes across the hinge angle θ, a high-speed eddy or swirl S occurs between the front hinge surfaces 40 and the rear hinge surfaces 42. This swirl has a lower pressure than the surrounding water, thus the front and rear hinge surfaces 40, 42 are drawn together A, reducing the hinge angle θ on one side of the lure 10. Each hinge 16 is generally symmetrical, so one side of the hinge 16 will be working against the other. As the lure is started, localized disturbances in the water around the lure, or irregularities in the lure body 10, will tend to favor one side over the other, closing the hinge angle θ on one side A as the opposite side of the hinge 16 opens B. As the hinge angle θ closes on one side, the aft body section 13, 14 is drawn toward that side, moving the tail of the lure 10 in that direction in a smooth, fluid motion. The motion looks like that of a real fish and eliminates the requirement of a lip or bill that affects the profile and lines of the lure.

As the hinge angle θ on the first side approaches zero degrees, the low-pressure zone S is reduced to the point where it cannot hold the front and rear hinge surfaces 40, 42 together. Thus, the low-pressure eddy S ceases. At the same time, the hinge angle θ on the second side is about double its original size. A large swirl forms in the hinge angle θ on the second side and draws the aft body section 13, 14 toward that side. This oscillating pattern repeats as the lure body 10 is drawn through the water. Where the body 10 has two hinges 16, the hinges 16 will act in opposite or alternating directions simultaneously. Thus, where the body 10 is made of three body segments 12, 13, 14, the segments will form alternate zigzag shapes.

The low-pressure swirl is enhanced where the rear hinge surface 42 is slightly wider or broader than the front hinge surface 40 to which it is paired. See FIG. 3 for this feature. FIG. 1 shows that the side profile of the body 10 is undisturbed from its natural shape. However, when viewed from above or below, the rear end of each forward body segment 12 or center body segment 13 will be slightly narrower than the front of the paired center body segment 13 or aft body segment 14.

FIG. 5 shows a cross section of a portion of the forward body segment 12. A buoyancy insert 18 is inside the forward body segment 12 and controls the buoyancy characteristics of the lure. For example, the insert 18 may make the lure float (positive buoyancy), sink (negative buoyancy) or neither (neutral buoyancy). Two or more different materials, having different buoyancy characteristics may be combined. A first buoyancy material 30 may be of lesser density than the second buoyancy material 32. The more dense material 32 at the bottom will tend to keep the lure upright underwater. A line eye 20 and a hook eye 24 provide attachment points for those elements.

In another embodiment, the lure body 10 includes a hook magnet 26 that is attached to a body segment 12, 13, 14 ventrally. The distance between the magnet 26 and a fish hook eyelet 22 approximates the length of the fish hook's shank. In this manner, the hook 24 can be removably attached to the ventral side of the body 10 while still attached to the eyelet 22. The hook 24 is kept from dangling and disturbing the lines and motion of the lure body 10, yet is quickly and easily deployed as a fish strikes. The hook 24 simply pops free from the magnet 26 when a fish strikes. The magnet 26 has the added benefit of adding additional mass to the ventral side of the body 10, further improving the tendency of the lure body 10 to remain upright as it is drawn through the water.

Where different hooks are desired, the hook 24 can be made removable though the use of a double shank 50. The two shanks 54, 56 may be formed from a single wire to make a single eye 52 and two parallel, unattached shanks 54, 56. The pair of shanks 54, 56 are flexibly held tightly against each other.

One shank 54 can include a single hook point, while the other shank 56 can include one or two points. The points can be arranged in a standard, 120 degree spacing, or a custom distribution to fit the lure body 10 and the magnet 26 more closely.

Figure 7:
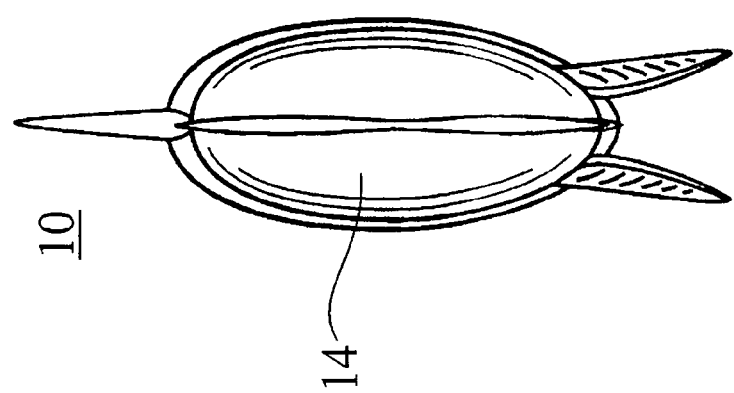
FIGS. 6 and 7 are front and rear views of the fish lure, according to the present invention.
Figure 6:
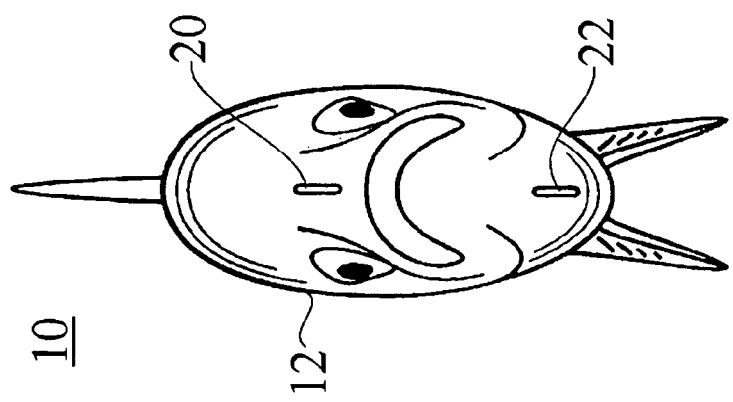
Figure 8:
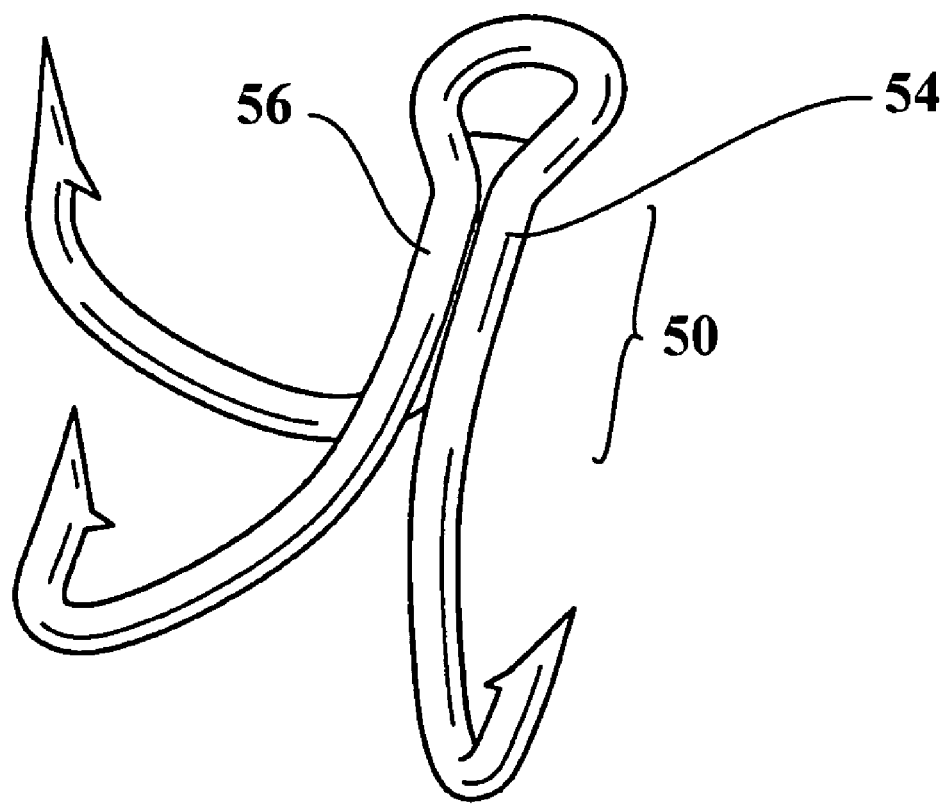
FIG. 8 is a perspective view of a removable, double-shank hook, according to the present invention.

FIGS. 6 and 7 are front and rear views of the fish lure and show how streamlined the body 10 is and how closely the shape of the body 10 mimic that of a real fish.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A fish lure, comprising:
    a fish shaped body, the body further comprising:
        a forward body segment and an aft body segment connected by an integrally-formed vertical hinge, the vertical hinge further including a pair of vertical grooves extending from a dorsal surface to a ventral surface of the body, the grooves defining a hinge web that attaches the forward body segment to the aft body segment, and the forward body segment and the aft body segment each having a pair of sides which extend between the dorsal and ventral surfaces;
        a pair of front hinge surfaces, each of the front hinge surfaces extending between a respective side of the pair of sides of the forward body segment and the web so as to extend along one side of a respective groove of the pair of grooves;
        a pair of rear hinge surfaces, each of the rear hinge surfaces extending between a respective side of the pair of sides of the aft body segment and the web so as to extend along an opposing side of the respective groove of the pair of grooves, where the front hinge surface and the rear hinge surface on a same side of the body define a hinge angle between 5 degrees and 20 degrees when at rest, where each of the rear hinge surfaces and each of the front hinge surfaces is angled aft toward the aft body segment, where each of the rear hinge surfaces and each of the front hinge surfaces extends from the web at a first location and terminates at a second location at its respective side surface with the first location being forward of the second location, where each of the rear hinge surfaces extends laterally beyond its corresponding front hinge surface on the same side of the body; and
    a buoyancy-controlling insert inside the forward body segment.

2. The fish lure of claim 1, where the grooves are symmetric when viewed from above.

3. The fish lure of claim 1, where the hinge angle is about 10 degrees.

4. The fish lure of claim 1, where each of the front hinge surfaces is angled aft about 15 degrees.

5. The fish lure of claim 1, where each of the front hinge surfaces is angled aft between zero and 20 degrees.

6. The fish lure of claim 1, where each of the rear hinge surfaces is angled aft about 25 degrees.

7. The fish lure of claim 1, where each of the rear hinge surfaces is angled aft between 10 and 30 degrees.

8. The fish lure of claim 1, further comprising:
    a plurality of vertical hinges integrally-formed into the body.

9. A fish lure, comprising:

two or more body segments connected by one or more vertical hinges, the two or more body segments including a forward body segment and an aft body segment, the forward body segment and the aft body segment each having a pair of sides which extend between dorsal and ventral surfaces of the fish lure, the one or more hinges permitting horizontal, lateral movement of the body segments relative to each other, where the body segments and the one or more hinges are formed from a single piece of a flexible homogenous material, each of the one or more hinges further comprising a pair of symmetric grooves separated by a hinge web, the grooves including a taper that is closed at the web, the taper comprising an included angle of between 5 and 25 degrees when the body segments are aligned and parallel; a pair of front hinge surfaces, each of the front hinge surfaces extending between a respective side of the pair of sides of the forward body segment and the web; a pair of rear hinge surfaces, each of the rear hinge surfaces extending between a respective side of the pair of sides of the aft body segment and the web, where the front hinge surface and the rear hinge surface on a same side of the fish lure define the included angle therebetween, where each of the front hinge surfaces and each of the rear hinge surfaces are angled aft toward the aft body segment, where each of the rear hinge surfaces and each of the front hinge surfaces extends from the web at a first location and terminates at a second location at its respective side surface with the first location being forward of the second location, where each of the rear hinge surfaces extends laterally beyond its corresponding front hinge surface on the same side of the fish lure;

a buoyancy-controlling insert inside the forward body segment; and a hook magnet attached to one of the two or more body segments ventrally, where a distance between the magnet and a fish hook eyelet on the fish lure approximates a length of a fish hook's shank.

10. The fish lure of claim 9, where the taper is angled rearward between 10 and 20 degrees.

11. The fish lure of claim 9, further comprising a removable fish hook, the fish hook comprising a pair of parallel shanks forming an eye, a first shank of the pair of parallel shanks having a single hook, and a second shank of the pair of parallel shanks having a pair of hooks, the pair of shanks flexibly held tightly against each other.

* * * * *